Nov. 3, 1959 S. L. JONASSEN 2,910,874

TUNING DEVICES AND THE LIKE

Filed June 13, 1958 2 Sheets-Sheet 1

INVENTOR.
SEVERIN L. JONASSEN
BY
F. D. Prager
ATTORNEY

INVENTOR.
SEVERIN L. JONASSEN
BY
F. D. Prager
ATTORNEY

United States Patent Office 2,910,874

Patented Nov. 3, 1959

2,910,874

TUNING DEVICES AND THE LIKE

Severin L. Jonassen, Lafayette Hill, Pa., assignor to Philco Corporation, Philadelphia, Pa., a corporation of Pennsylvania Application June 13, 1958, Serial No. 741,824

4 Claims. (Cl. 74—10)

This invention relates to tuning devices and the like, as used for instance in broadcast receivers, particularly in television receivers.

Attempts have heretofore been made to "conceal" the tuning and control knobs of receivers, particularly when a receiver was designed as an article of domestic furniture, exposing no technical "gadgetry" to sight. However, shortcomings have been found in the concealed or concealable tuners which have, thus far, been made available, and their use has therefore been relatively limited. For instance, most of the earlier concealable tuning knobs were so arranged that they allowed no truly convenient and effective operation of TV receivers and the like, particularly none in connection with modern receiver circuitry which provides for fine as well as coarse tuning. While both fine and coarse tuning can be obtained by conventional, concealable knobs, arranged side by side and adjacent still further knobs for sound control and the like, the gadgetry thus provided has become entirely too prominent and too complex to be reconciled with the concept of the receiver as a piece of furniture. In addition, many of the concealable tuners, hitherto known, were poorly visible even when the tuning knobs were exposed for use; and some of them were defective in other respects, for instance as to positive and reliable actuation and motion. Those several defects were further connected with a lack of such economy as is required for the successful fabrication and marketing of broadcast receivers.

It is accordingly a general objective of this invention to obviate such defects and to provide a concealable, unitary, finely and coarsely tunable control device for broadcast receivers. It is a further object to provide such a device which responds to simple actuation, such as fingertip control of the push button type, applied to a single tuning unit.

It was found possible to achieve these objects, and others which have been or will be outlined herein, by the use of a novel combination of parts. According to one aspect of the invention, a pair of knob elements are rotatable relative to one another and also relative to a receiver set, while both knob elements are axially movable conjointly, relative to the set. According to a further aspect of the invention, such a knob assembly is arranged for axial movement in either of two opposite directions, in response to successive manual pushes, applied to a top surface of said assembly in a single direction.

Figure 1:
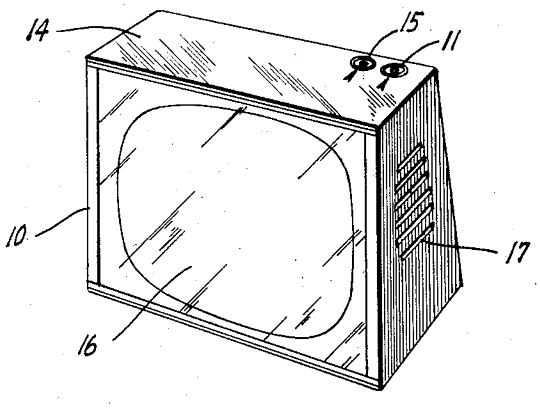
Figures 2, 3:
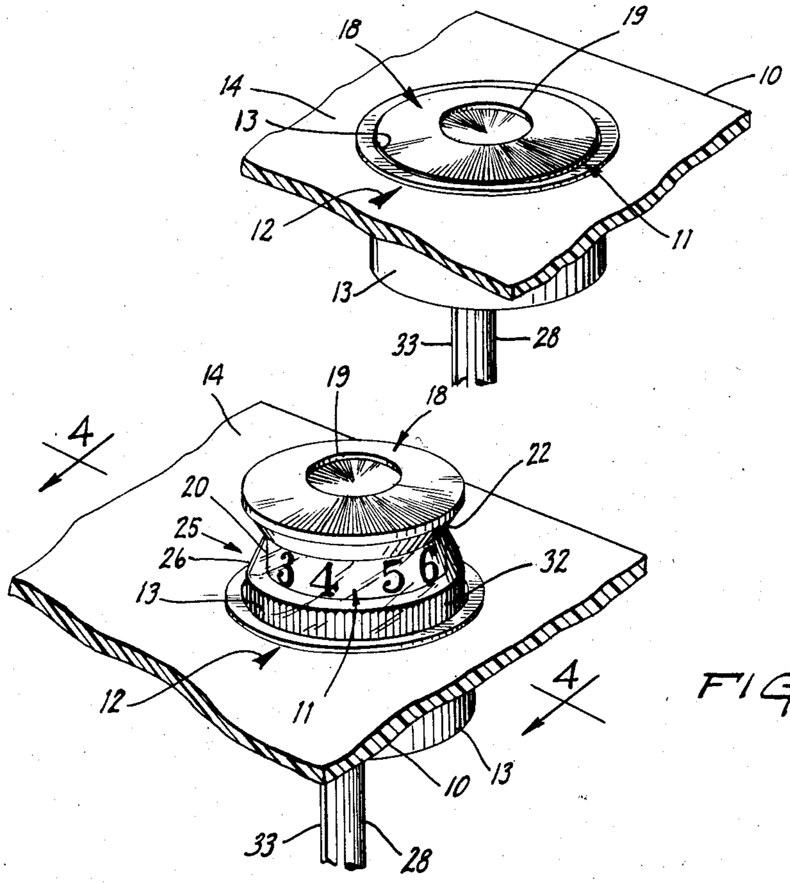
Figure 4:
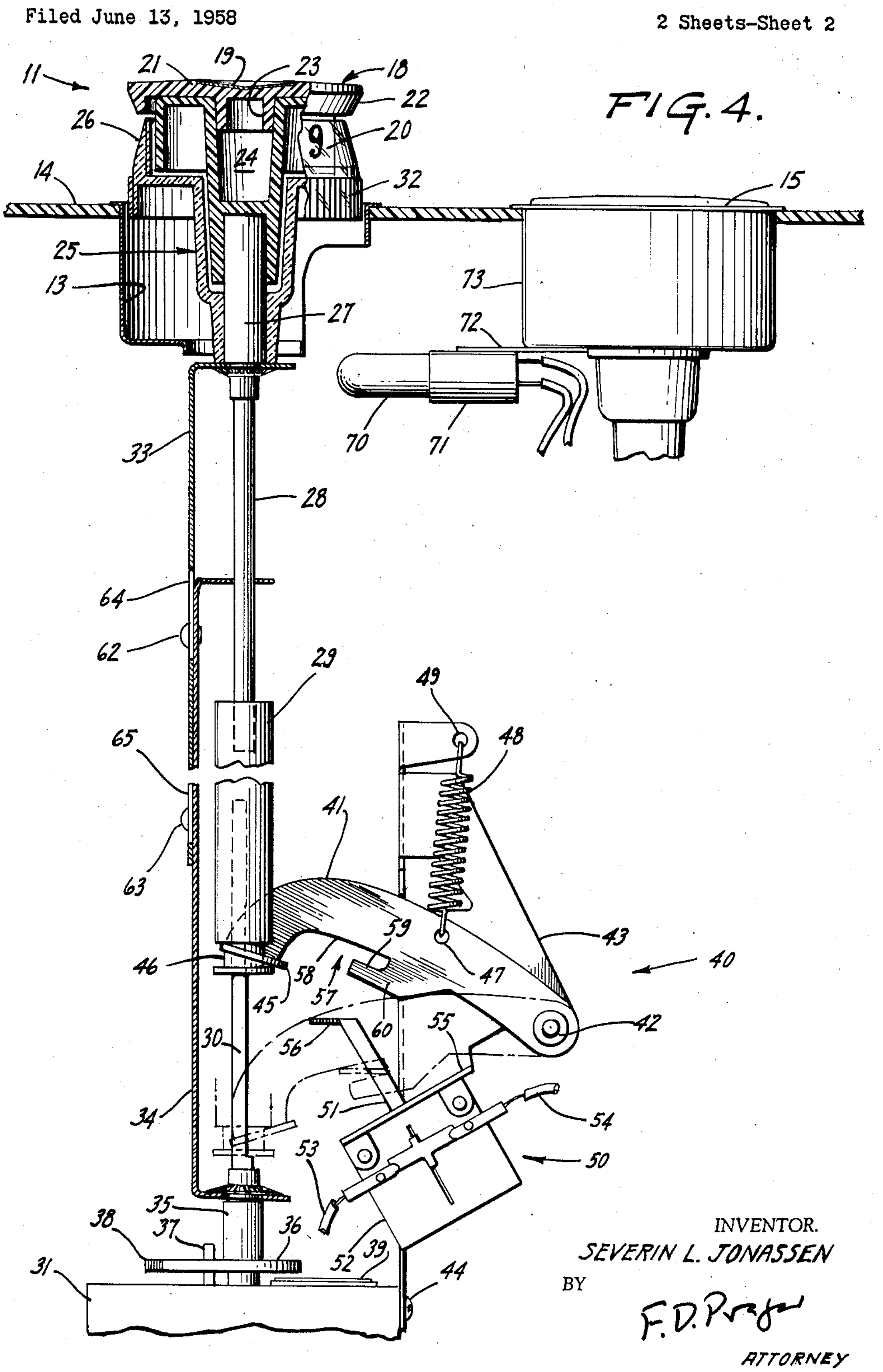

In the drawing, Figure 1 is a perspective front view of a television receiver equipped with the new device; Figure 2 is a similar but enlarged view of the new device itself when concealed; Figure 3 is a similar enlarged view of the said device when exposed. Figure 4 is an enlarged view, generally in section along line 4—4 in Figure 3 showing details of the device and of switching linkage and auxiliary devices.

Referring first to Figures 1 to 3: the television receiver 10 has a combined, fine and coarse tuning or control knob 11, which is shown in its depressed and concealed form in Figures 1 and 2, whereas it is fully exposed in Figure 3. As best shown in Figures 2 and 3, a tuner indexing mark or pointer 12 is provided, adjacent to a circular depression or recess 13 in the top panel 14 of the set. The tuning knob 11 is adapted either to be pushed into this recess (Figure 2), or to project upwardly therefrom (Figure 3) for manual operation and channel selection. Top panel 14 also has a speaker on-off switch and sound volume control member 15, see Figure 1, this last-mentioned member having appearance, and if desired, construction similar to that of the concealed knob 11. Conventional circuitry elements, not shown and which are suitably arranged in receiver 10, are controlled by knobs 11, 15 for turning the receiver on and off for the control of a television image, to be shown by screen 16, and of sound, to be emitted by speaker 17.

When knob 11 has been pushed downwardly into recess 13, a flat top surface portion 18 of this knob is subtially flush with panel 14 (Figure 2), although raised or depressed, functional or ornamental markers 19 may be incorporated in said top portion; and the recess 13 is closed by the top structure 18. The entire top structure (Figure 1) then presents a substantially smooth surface, which is functionally decorative as it can match the surfaces of other items of furniture, while it conceals technical details such as indicator section 20 (Figure 3). This concealed and closed arrangement also serves to protect such parts as tuning indicator section 20 from injury, for instance incident to the storage of the receiver.

When top 18 of concealed tuning knob 11 (Figure 2) is downwardly pressed and then released again, connected linkage (Figure 4) causes the knob to project upwardly from panel 14, whereupon the knob exposes the aforementioned indicator section 20. This section desirably presents a large, approximately cylindrical surface, upstanding between the horizontal surfaces 14, 18, which surface is provided with markings such as channel numbers "3," "4," "5," etc., as shown in the drawing. One of these members may now be turned toward stationary marker 12, for basic station selection, such turning and basic selection being performed by manually gripping a cover 21, or the peripheral edge 22 thereof, which forms an exposed, horizontal part of top portion 18, and by turning the same and thereby turning indicator section 20. This latter section forms part of upper knob structure 18, the aforementioned horizontal part 21 having a central boss 23, which boss is secured, for instance by press fitting, to a socket or hub member 24, and said socket member in turn having indicator section 20 peripherally depending therefrom.

The socket portion 24 of top member 18, as further shown in Figure 4, is rotatable in and relative to a lower part 25 of turning knob 11; and fine tuning can be effected by independent rotation of this lower part. The lower part 25 desirably comprises a transparent or translucent plastic wall portion 26, confronting and surrounding the aforementioned indicator section 20 which carries channel indicia "3," "4," "5," etc. (Figure 3); said wall portion 26 desirably having plano-convex cross-section, so that it acts as an annular magnifying lens for said indicia.

Station selection is achieved by the upper knob member 18, the central or hub portion 24 of which (Figure 4) desirably has an upper end 27 of a vertical shaft 28 secured thereto, as by press fitting; the lower end of said shaft having the top of a coupling member 29 similarly secured thereto. In order to allow the knob-concealing and knob-presenting motions, the bottom end of coupling member 29 is longitudinally slidable over a vertical shaft 30, said shaft engaging said coupling member with a flattened surface to prevent rotation of the member relative to the shaft, and the lower end of the shaft forms the mechanical input member of a conventional station selector device 31, suitably mounted in the set.

The aforementioned lower or fine tuning member 25, as further shown in Figure 4, has a lowermost hub portion pivoted on the shaft element 27, which element as mentioned is secured to the upper knob element 18. Thus the lower or fine tuning member 25 can be rotated about the knob and shaft structure 18, 27. Such rotation of the fine tuning member is manually effected, with the aid of a ring portion 32 thereof which is rigid with and disposed below annular lens portion 26. This ring portion 32 is exposed directly above top panel 14 when tuning assembly 11 has been raised to the upwardly projecting position thereof as shown. The said ring 32, by means of the control or hub portion of lower knob element 25, imparts rotation to a yoke 33, 34 pivoted on shaft 28, 29, 30. The bottom end of this yoke is secured to a sleeve 35 which carries a conventional fine tuning cam 36, on the top of the aforementioned station selector assembly 31. A stop 37 is provided for abutment with a lug 38 on cam 36 in certain positions of said cam; and said cam cooperates with a stationary condenser element 39, or the like, for fine tuning.

The tuning assembly, as illustrated in Figure 4, is advantageously held in vertically extending position by engagement of portion 32 thereof with the walls of recess 13 and engagement of lower shaft elements 30, 35 with the suitably mounted station selector 31. The upper parts of said assembly are held in raised position, against the weight thereof, by means of an actuator linkage 40. This linkage includes a lever 41 pivoted at 42 to a rigid standard 43, which standard is secured to selector unit 31 at 44. An end or key portion 45 of lever 41 engages a slot or groove 46 on coupling member 29, and in intermediate portion 47 of lever 41 is urged upwardly by a spring 48, anchored on standard 43 at a suitable point 49.

The actuator linkage system 40 also comprises a self-latching and self-unlatching "on-off" switch 50, well-known by itself and including a mechanism, not shown, which engages a switch actuator rod member 51 in such manner that said member, when pushed into the switch, is latched within switch structure 52, for turning the television set "off," whereafter a second and generally similar push against the same actuator rod member 51 causes unlatching of said member and resilient outward return thereof from switch structure 52 for turning the set "on." Wires 53, 54 connect switch 50 with suitable portions of the circuitry of the set, not shown. The switch is mounted on standard 43 by means of a bracket 55.

A terminal bar portion 56 of the switch actuator rod provides a lost-motion linkage with a cooperating part 57 of the aforementioned lever 41. In the interest of complete disclosure, the operation of these parts 56, 57, will be described as follows.

Starting with the upper or full-line position of parts 41, 51, it will be seen that downward pressure, transmitted by coupling member 29, depresses key member 45 and thereby lever 41, against the tension of spring 48. As lever 41 swings downwardly, a lower surface 58 on the lever engages the raised terminal part 56 of switch actuator 51; and as downward motion of lever 41 continues, surface 58 depresses said actuator into switch structure 52. This latter structure, as mentioned, is self-latching; it can readily be so arranged that the self-latching operation thereof occurs shortly before parts 41, 51 reach their lowermost positions, illustrated in broken lines. When this lowermost position has then been reached, the switch and the entire set have been turned "off"; switch actuator rod 51 is then prevented from further downward and inward sliding by suitable stop means, not shown, thereby also providing a lower stop for the downward depression of shaft coupling 29 and of knob unit 11; meanwhile, as may have been noted, an upper surface 59 of a tongue 60 on lever 41 has been moved to a position below horizontal bar portion 56 of switch actuator 51; and therefore, although the knob unit is normally released after any downward push applied thereto, and although spring 48 then tends to raise lever 41 and the parts connected therewith, these latter parts cannot now be raised, except very slightly as allowed by resilient features or lost motions. Thus the set remains turned "off."

The set can then be turned "on" by again pushing knob 11 and thereby pushing lever 41 and actuator 51 downwardly beyond the aforementioned, slightly raised position, thereby operating the aforesaid self-unlatching mechanism of switch 50, energizing the set, and allowing spring 48 to raise the knob assembly 41, 29, 28, 11.

Downward and upward movements of knob assembly 11 are facilitated by the construction of the shafting as shown. In other words, shaft 28, 29, 30 and yoke 33, 34 allow the downward motion of the shaft coupling 29, by means of the aforementioned axially slidable joint arrangement provided between shaft and coupling elements 29, 30 and by means of suitable pins 62, 63, slidable in slots 64, 65 in one of the yoke members 33, 34.

In the uppermost position of the knob assembly, the turning "on" of switch 50 results in a number of electrical operations in the circuitry of the set, not shown. Among other things, the switch energizes an incandescent lamp 70 (Figure 4), held in a socket 71 on a bracket 72 secured to housing 73 of speaker control structure 15, so that the raised, transparent channel indicia carrier 20 of the raised knob assembly now is illuminated from below, for clear viewing thereof in an unlighted or dimly lighted room, through annular lens means 26 forming part of lower knob portion 25. Thus it is now very easy to effect both coarse and fine adjustments of knob 11 (Figure 3), by rim 22 and ring 32, respectively.

It will thus be seen that a particularly effective tuning or control structure has been formed by means of the new elements, shown in Figures 1 to 3 and the top part of Figure 4, in combination with a latching structure or the like which may comprise the well-known station selector, tuning and switch elements 31, 38, 50 and the linkage structure 41, 48. By means of this control structure, the user can either conceal the unitary coarse and fine tuning device (Figure 1), or extend it for axial use, by merely applying a push button type actuation to the top of the structure; the said unitary device, when extended for use, being available for basic selection as well as for fine tuning, by the turning of upper and lower knob portions 22, 32, respectively. This arrangement has been found to reduce the complexity of operation of TV receivers and the like to the barest minimum, while at the same time providing a maximum of convenience, safety and decorative effect, and while avoiding any excessive cost of fabrication and likelihood of service trouble.

While only a single embodiment of the invention has been decribed, it should be understood that the details thereof are not to be construed as limitative of the invention, except insofar as is consistent with the scope of the following claims:

I claim:

1. In a control device for a broadcast receiver: a station selector; a tuner for finely tuning the receiver; a pair of control knob elements, one surrounding the other; linkage rotatably connecting one of said control knob elements to said station selector; linkage rotatably connecting the other control knob element to said tuner; means associated with said control knob elements and linkage and allowing both elements to rotate, one relative to the other, for applying control action to the selector by the first linkage and for applying control action to the tuner by the other linkage; means for axially moving both elements, conjointly with one another, between spaced positions; an on-off switch; linkage reciprocably connecting said control knob elements to said switch for operation of the switch upon said axial moving of both elements; and means for substantially concealing both elements in one of said positions and for substantially exposing both of them in the other position.

2. In a broadcast receiver, a cabinet having a recess in a flat surface thereof; a dial and knob assembly shaped in conformity to and adapted substantially to fill said recess, said dial and knob assembly being adapted also to be extended from said recess to a position coaxial with the recess and just above said surface, and said dial and knob assembly including: a central push button structure to provide a knob; a ring structure surrounding the push button structure and approximately coextensive therewith in axial dimension to provide a dial, said structures being rotatable relative to one another and relative to the cabinet and being axially movable, conjointly, relative to the cabinet, and at least the ring structure being transparent; index means, such as numerals, on the push button structure, visible through the transparent ring structure;

and tuning and selector devices in said cabinet, individually rotatable with said respective structures.

3. Apparatus as described in claim 2 additionally including means for illuminating said index means visible through said transparent ring structure.

4. Apparatus as described in claim 2 wherein said transparent ring structure is adapted optically to magnify the index means visible through the same.

References Cited in the file of this patent

UNITED STATES PATENTS

| | | |
|---|---|---|
| 2,367,892 | Schallis | Jan. 23, 1945 |
| 2,682,859 | Jensen et al. | July 6, 1954 |
| 2,738,758 | Cutter et al. | Mar. 20, 1958 |
| 2,841,031 | Young et al. | July 1, 1958 |